Feb. 22, 1966 G. CLEAVES 3,236,074
DEFATTING OF ANIMAL SKINS
Filed Nov. 19, 1963

INVENTOR.
GENE CLEAVES
BY Frederick F. Mack,
Michael J. Quillinan and Walter D. Ames
ATTORNEYS

United States Patent Office 3,236,074
Patented Feb. 22, 1966

1

3,236,074
DEFATTING OF ANIMAL SKINS
Gene Cleaves, Wakefield, Mass., assignor to General Foods Corporation, White Plains, N.Y., a corporation of Delaware
Filed Nov. 19, 1963, Ser. No. 327,866
5 Claims. (Cl. 69—21)

This invention relates to the treatment of animal skins, and more particularly to a novel process and apparatus for removing a substantial portion of the fat and moisture from pig skins.

Pig skins are one of the most important collagen-bearing materials utilized as a source of gelatin, other such sources being trimmings from calf and sheep skins, cattle hides and other animals, and ossein. Pig skins, having no separating tissue between the skin and the flesh or meat, have the fat and moisture impregnated in the skin and directly connected to it. The gelatin manufacturer, however, is not interested in purchasing or paying for the transportation of fat and moisture; he is interested in obtaining protein in the form of collagen from which gelatin can be extracted. This collagen is only in the skin, itself.

Since a large part of the expense of producing gelatin from skins is the cost of shipping the skins from the packing house to the gelatin manufacturer, it is most important from an economic viewpoint that the skins shipped contain as much protein per pound of shipping weight as possible. Improvement in the protein ratio can be obtained by removal of as much fat and moisture from the skins as possible prior to their shipment. While it may have been practical many years ago to have fat removed by hand from the pig skins, such removal is now completely impractical because the labor costs for removing the fat are so expensive that they consume a large part of the savings effected by shipping more protein per pound. Yet it still has been found highly desirable to have such fat removed, particularly if this can be done automatically and mechanically to avoid high labor costs.

It is, therefore, a primary object of the present invention to provide a process for expressing substantial quantities of fat and moisture from pig skins, and like fat impregnated products, which process is effected primarily through mechanical means and with a minimum of labor required.

It is a further object of the present invention to provide an apparatus which will carry out the process in an efficient manner such that a continual feed of skins into the apparatus can be maintained and a continual discharge of defatted, demoistured skins obtained subsequent to passage of the skins through the apparatus.

According to the process of the invention, a skin such as a piece of pig skin is passed into the nip formed by a pair of rotatable, closely spaced drums. The drums are rotated to draw the skin into and through the nip. As the skin passes through the nip, it is squeezed and stretched so that a substantial quantity of fat is removed therefrom. Under circumstances where skins to be processed are treated while in a cold condition, e.g., about 40° F to 45° F., it has been found advantageous to heat one or both of the drums so that the skins are simultaneously softened and the fat brought to a semi-solid and at least partially flowable condition during expression thereof. The drums may, for example, be heated to a temperature of about 100° F. to 200° F., preferably 125° F., as the skins are passed through the nip between the drums and thus into contact with the drums.

Apparatus for expressing the fat and moisture is constructed, according to a preferred embodiment thereof, from a pair of rotatable, closely spaced drums at least one of which has a multiplicity of adjacent, parallel ribs projecting outwardly from its circumference. However, other forms of protuberances extending outwardly from the cylindrical surface of at least one of the drums can be substituted for the ribs, provided such protuberances aid in grasping a skin in the nip of the drums and holding the skin so that it can be squeezed as it passes through the nip.

In a preferred embodiment of the apparatus of the invention, the parallel ribs are located on each of the drums. The drums are so disposed that ribs on each of the drums are successively aligned with and cooperate with grooves on the other of the drums as the drums are rotated. During such rotation the ribs extend into the grooves formed between the ribs of the other drum so that ribs on adjacent drums mesh. This cooperation between rib and groove acts to force a skin passing through the nip of the drums partially into the grooves and thus stretches and squeezes the skin. Such squeezing and stretching acts to remove a substantial quantity of the fat from the skins. A quantity of moisture is also removed, although the removal of moisture may not be so apparent when it is measured in percentage of moisture in the skins prior to and after processing. The actual quantity of moisture in each skin, however, will be mitigated.

When the apparatus according to the present invention is utilized, fat in the skins will be squeezed from the skins and thereby deposited in the grooves between the parallel ribs of the drums. When the ribs are disposed so that they extend generally laterally across the cylindrical surfaces of the drum, the ribs will tend to move anything on the drums toward the outer ends thereof. While the skins in the nip between the drums are held against lateral movement, the expressed fat and moisture in the grooves of the generally lateral ribs will be moved in those grooves toward the outer ends of the drums. When the fat is, by reason of its inherent flowability, the presence of admixed water, or the temperature of the drums, maintained in a fluid or semi-solid condition, the fat will pass through the grooves and from the drums. Thus, use of the preferred apparatus of the invention will result in a process which is continuous in that a succession of defatted, demoisturized skins deposited in a container or other receptacle subsequent to their passage through the nip, and a continuous flow of fat and moisture from the skins discharged from the outer ends of the drums. A plurality of pairs of drums, arranged in series, may be used to act successively on the same skin to assure maximum removal of fat and moisture.

These and other objects, features and advantages of this invention will be better understood by reference to the illustration of a perferred embodiment of the apparatus of the invention in the accompanying drawing, which forms a part hereof, and in which.

Figures 1, 2, 3:
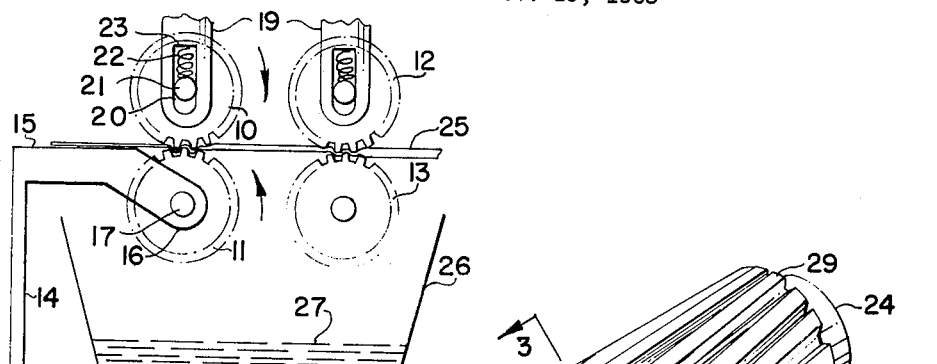
FIG. 1 is a diagrammatic, side elevational view of a preferred embodiment of the apparatus of the invention.
FIG. 2 is an enlarged perspective view showing the rotatable drums of the preferred embodiment, such drums being spaced apart for the purposes of illustration only.
FIG. 3 is a further enlarged, transverse sectional view along the line 3—3 of FIG. 2 showing a skin as it passes through the nip formed by the drums, which are viewed in operating relationship.

Referring now to the drawings, and in particular to FIG. 1 thereof, the apparatus of the invention is illustrated by two pairs of drums identified by reference numerals 10 and 11, and 12 and 13, respectively. These drums are disposed in series so that they act successively on animal skins which are to be defatted and demoisturized. That pair of drums which are numbered 10 and 11 have been illustrated more specifically with reference to their maintenance in operative position. Thus, lower drum 11 is supported by a frame 14, which has a substantially horizontally extending arm 15 that supports drum 11. Drum 11 has a trunnion which is journaled in depending portion 16 of arm 15, such trunnion being identified by reference number 17. It will be understood that the frame 14 with a corresponding arm 17 is similarly located at the opposite end of the drum 11, which terminates at that end in a trunnion 18.

Drum 10 is located directly above drum 11 and is supported by means of a depending frame part 19. Frame part 19 is formed with a slot 20 near its lower most extension, and trunnion 21 or drum 10 extends into and is journaled in slot 20. As is diagrammatically illustrated in FIG. 1, depending frame part 19 is spring loaded, a compression spring 22 being disposed in the slot between rotatable trunnion 21 and the upper terminus 23 of the slot. A trunnion 24 duplicates trunnion 21 at the other end of drum 10, trunnion 24 likewise being spring biased. It will thus be apparent that spring 22 continuously exerts a force on trunnion 21 and, therefore, on drum 10 urging drum 10 in the direction of drum 11. The provision of spring loading effects a substantially uniform force continuously urging the drum 10 in a downward direction as seen from the illustration of FIG. 1 toward drum 11 thereby compressing the skin which is to be forced between the drums, such skin being identified by reference numeral 25. This continuous force allows the drum 10 to move in an upwardly direction away from drum 11 when a particularly thick skin is passed into the nip formed by drums 10 and 11. Spring loading of the upper drum 10, therefore, permits a continuous force to be applied to each skin that passes between the drums regardless of the thickness of the skin. Additionally, a safety factor is provided should any foreign matter of considerable thickness and rigidity be inadvertently passed into the nip formed by the drums. A hopper 26 serves as a receptacle for fat and moisture expressed from a skin 25 during its passage between the drums. Hopper 26 is shown partially filled with expressed fat and moisture 27. The other pair of drums 12 and 13 are supported in a manner similar to that of drums 10 and 11.

FIG. 2 is an enlarged perspective view of the pair of drums 10 and 11 of the present apparatus. Drums 10 and 11 mesh with each other to express fat and moisture from skins, the drums being spaced apart in FIG. 2 for the purpose of clarity, only. Each drum is formed with a multiplicity of spaced, parallel ribs 29 on its periphery. Between adjacent ones of ribs 29, grooves 30 are formed. Ribs 29 extend generally laterally across the substantially cylindrical circumference of each of the drums 10 to 13, although in the preferred embodiment illustrated the ribs of cooperating drums 10 and 11 have their outer terminals out of alignment with the inner terminals of the ribs, which extend helically across the drum surface. As viewed in FIG. 2, the ribs of drum 10 spiral upwardly from right to left while the ribs of drum 11 spiral downwardly from right to left.

The ribs 29 are arranged in a gentle spiral along the cylindrical circumferences of the drums, and it will be apparent that as the pairs of drums illustrated in FIG. 2 are moved together so that they cooperate with one another, each rib 29 will be partially disposed in a groove 30 on the other cooperating drum. Thus each rib 29 on drum 10 will, when drums 10 and 11 are in cooperating position, be located directly opposite a groove 30 between adjacent pairs of ribs 29 of drum 11. The drums will cooperate with each other in such a manner that, when only one of the drums is powered, the power means being conventional and not illustrated, the driving drum will power and rotate the driven drum. As presently contemplated, drum 11 will be the driving drum while drum 10 will be driven by the driving drum.

The squeezing and stretching action of cooperating drums 10 and 11 is best illustrated in FIG. 3. It will there be seen that pig skin 25 passed into the nip formed by drums 10 and 11 is stretched as a rib 29 is rotated so that it passes partly within the groove formed by the two ribs between which it fits as drums 10 and 11 rotate. As shown, rib 29a on drum 11 fits partly into the groove 30 formed between adjacent ribs 29b and 29c on drum 12. In order to accommodate itself to the extension of rib 29a into the groove 30, skin 25 is stretched at a region generally identified by reference numeral 37. It is also squeezed at that general area as the rib 29a is brought into close relationship with ribs 29b and 29c, skin 25 being disposed between rib 29a and the other two ribs. This stretching and squeezing of area 32 of skin 25 is repeated over the entire surface of the skin as the skin enters and passes through the nip formed by cooperating drums. The stretching and squeezing action tends to express from the skin 25 a substantial portion of the fat with which that skin is impregnated.

As the drums 10 and 11 rotate, fat and moisture are expressed into the grooves 30 of both upper drum 10 and lower drum 11; however, a greater amount of fat and moisture is found in grooves 30 of drums 11, since fat and moisture tend to congregate there by gravity. Due to the shape of the grooves 30 and the pressure of later expressed fat and moisture, fat and moisture expressed from the skins 25 pass in the grooves 30 to the outer ends of the drums and from there fall into one or more hoppers 26. The skins, themselves, pass through the nip formed by the cooperating drums and are then gravity discharged into suitable receptacles (not shown) or into the nip of other drums identical to drums 10 and 11. Since solid fat is not easily expressed into grooves 30, one or both of the cooperating drums may be heated, preferably to a temperature of about 100° F. to 200° F., unless the temperature of the skins as they enter the nip is such that the solid fat is expressed from the skins in the form of a water emulsion which is at least semisolid. Such an emulsion is capable of flowing through the grooves 30 into the hopper 26.

The stretching and squeezing action of the cooperating ribs and grooves of adjacent drums has been found to act on the skins so that squeezing of the skins to press out fat and moisture will be more effectively accomplished. Doubled-over pieces of skin will be spread out as they pass into the nip of the drums; there will thus be more skin surface pressed and squeezed, and the surface of the skin so acted on will be pressed and squeezed more uniformly.

According to specific examples of the present method, pig skins received from a Townsend skinner manufactured by Townsend Engineering Company, Des Moines, Iowa, were positioned in the nip of the drums illustrated in FIGS. 1 to 3 of the drawing. Of course, skins removed from machines other than a Townsend skinner may be utilized. Advantageously, such skins may be automatically directed to the present apparatus and into the nip between the drums without further manual handling. As used, each drum was three inches in diameter. The skins entering the nip were at room temperature, and the drums were not internally heated. No external heat was supplied to the drums other than that developed in the course of the expressing process. Pig skins known to the trade as gelatin skins were introduced into the nip, and fat and moisture expressed therefrom in one pass through only one pair of drums. An analysis of skins prior to and after expression of fat and moisture follows:

EXAMPLE I

|  | Untreated Skins | Defatted Skins |
|---|---|---|
| Weight of stock, grams | 919 | 731 |
| Percent moisture | 44.82 | 50.50 |
| Percent fat (grease) | 26.60 | 14.67 |
| Percent protein as gelatin (air-dried) | 29.14 | 35.74 |
| Total percent | 100.56 | 100.91 |

EXAMPLE II

|  | Untreated Skins | Defatted Skins |
|---|---|---|
| Weight of stock, lbs | 20 | 15.78 |
| Percent moisture | 36.46 | 44.12 |
| Percent fat (grease) | 36.30 | 24.07 |
| Percent protein as gelatin (air-dried) | 27.61 | 32.71 |
| Total percent | 100.37 | 100.90 |

The following example illustrates defatting of animal skins after one and three passes through the pair of drums used in Examples I and II:

EXAMPLE III

|  | Untreated Skins | Defatted Skins (One Pass) | Defatted Skins (Three Passes) |
|---|---|---|---|
| Weight of stock, grams | 6,817 | 5,841 | 4,663 |
| Percent moisture | 28.60 | 33.70 | 42.70 |
| Percent fat (grease) | 48.34 | 41.50 | 26.40 |
| Percent protein as gelatin (air-dried) | 23.07 | 24.46 | 31.90 |
| Total percent | 100.01 | 99.66 | 101.00 |

From the above examples it will be seen that a substantial saving in shipping weight of skins has been effected by expression in accordance with the process and apparatus described hereinbefore. The loss of protein as gelatin due to the expressing operation was minimal. In Examples I and II, respectively, the decrease in shipping weight of the skins was 21 percent and 20 percent. In Example III the decrease was 19 percent after one pass and 32 percent after three passes. Such decreases without appreciable loss of protein as gelatin represent an important economic factor.

This application is a continuation-in-part of Ser. No. 136,216, filed Sept. 6, 1961, now abandoned.

It will be apparent that such obvious alterations and modifications in the process and apparatus described and illustrated herein as will be made by those skilled in this art will fall within the scope of the present invention. The present process and apparatus are, therefore, to be defined only by the scope of the following appended claims.

What is claimed is:

1. The method of expressing fat from raw animal skins, which comprises passing an unsupported skin into the nip formed by a pair of rotatable, closely spaced drums, each of said drums having a plurality of parallel ribs projecting from its circumference and forming grooves therebetween, the ribs on each of said drums being successively aligned with and projecting into but not completely occupying grooves on the other of said drums, rotating said drums to draw the skin between aligned ribs and grooves to squeeze and stretch the skin as the skin passes through said nip and remove a substantial quantity of fat therefrom, and continuing to rotate said drums to pass the skin through said nip.

2. The method of expressing fat from raw animal skins, in which the method as claimed in claim 1 is repeated successively until the quantity of fat in the skin is less than 30 percent of weight.

3. The method of expressing fat from raw animal skins as claimed in claim 1, in which a skin is passed through a nip formed by said drums at least three times.

4. The method of expressing fat from raw animal skins, which comprises passing an unsupported skin into the nip formed by a pair of rotatable, closely spaced drums at least one of which is heated to a temperature of about 100° F. to 200° F., rotating said drums to force the skin through said nip, and as the skin passes through said nip squeezing and stretching the skin to remove a substantial quantity of fat therefrom.

5. The method of expressing fat from raw animal skins as claimed in claim 4, in which at least one of said drums is heated to a temperature of about 125° F.

References Cited by the Examiner

UNITED STATES PATENTS

| 6,710 | 9/1849 | Hershey | 69—42 X |
| 1,090,799 | 3/1914 | Spigno | 69—33 X |
| 2,359,922 | 10/1944 | Knowlton et al. | 69—34 |
| 2,646,676 | 7/1953 | Campbell | 69—34 |
| 2,664,733 | 1/1954 | Campbell | 69—34 |

JORDAN FRANKLIN, *Primary Examiner.*